US010579630B2

(12) United States Patent
Lin et al.

(10) Patent No.: US 10,579,630 B2
(45) Date of Patent: Mar. 3, 2020

(54) CONTENT CREATION FROM EXTRACTED CONTENT

(71) Applicants: MICROSOFT TECHNOLOGY LICENSING, LLC, Redmond, WA (US); Ying Lin, Sammamish, WA (US); Mathias Jourdain, Beijing (CN)

(72) Inventors: Ying Lin, Sammamish, WA (US); Mathias Jourdain, Beijing (CN); Guang Yang, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 180 days.

(21) Appl. No.: 15/543,879

(22) PCT Filed: Jan. 14, 2015

(86) PCT No.: PCT/CN2015/070657
§ 371 (c)(1),
(2) Date: Jul. 14, 2017

(87) PCT Pub. No.: WO2016/112503
PCT Pub. Date: Jul. 21, 2016

(65) Prior Publication Data
US 2018/0004754 A1 Jan. 4, 2018

(51) Int. Cl.
*G06F 17/30* (2006.01)
*G06F 16/2457* (2019.01)
(Continued)

(52) U.S. Cl.
CPC ...... *G06F 16/24578* (2019.01); *G06F 16/435* (2019.01); *G06F 16/958* (2019.01);
(Continued)

(58) Field of Classification Search
CPC ............... G06Q 30/02; G06Q 30/0241; G06Q 30/0277; G06F 16/951; G06F 16/24578;
(Continued)

(56) References Cited

U.S. PATENT DOCUMENTS 7,421,504 B2    9/2008  Imaida et al.
8,326,686 B2 *  12/2012  Datar ..................... G06Q 30/02
                                                 705/14.49
(Continued)

FOREIGN PATENT DOCUMENTS

CN          101517650 A      8/2009
CN          101661490 A      3/2010
(Continued)

OTHER PUBLICATIONS

International Search Report and Written Opinion for PCT/CN2015/070657, dated Sep. 30, 2015.
(Continued)

*Primary Examiner* — Dangelino N Gortayo
(74) *Attorney, Agent, or Firm* — Merchant & Gould P.C.

(57) ABSTRACT

Examples of the present disclosure describe content creation of at least one abstract from extracted content. Input information is received that comprises a link to a landing page and keyword information. The landing page is evaluated and content including at least one of image data and text data is extracted from the landing page. Properties of the content extracted are analyzed. The content extracted is ranked based on the analyzed properties and application of at least two ranking algorithms. A first ranking algorithm applied ranks the content based on relevance to the landing page and a second ranking algorithm applied ranks the content extracted based on relevance to the keyword information. The ranked content is filtered to remove content or portions of content that are determined to be unappealing based on
(Continued)

applying filtering rules to the ranked content. At least one abstract is created from the filtered and ranked content.

20 Claims, 8 Drawing Sheets

(51) Int. Cl.
*G06F 16/435* (2019.01)
*G06F 16/958* (2019.01)
*G06F 16/951* (2019.01)
*G06F 16/34* (2019.01)
*G06F 16/22* (2019.01)

(52) U.S. Cl.
CPC ............ *G06F 16/22* (2019.01); *G06F 16/345* (2019.01); *G06F 16/951* (2019.01)

(58) Field of Classification Search
CPC .... G06F 16/3334; G06F 16/958; G06F 16/22; G06F 16/285; G06F 16/345; G06F 16/435; G06F 16/358
USPC ....... 707/706, 794, 812, 602, 603, 748, 756; 715/254, 209
See application file for complete search history.

(56) References Cited

U.S. PATENT DOCUMENTS

| | | | |
|---|---|---|---|
| 2005/0055271 A1* | 3/2005 | Axe | G06Q 30/02 705/14.52 |
| 2006/0041562 A1* | 2/2006 | Paczkowski | G06F 16/9562 |
| 2008/0172606 A1* | 7/2008 | White | G06Q 30/02 715/254 |
| 2009/0024718 A1* | 1/2009 | Anagnostopoulos | G06Q 30/02 709/218 |
| 2011/0295903 A1* | 12/2011 | Chen | G06F 16/367 707/794 |
| 2012/0030015 A1* | 2/2012 | Brunsman | G06Q 30/0251 705/14.49 |
| 2013/0191735 A1* | 7/2013 | Kumar | G06F 17/24 715/254 |
| 2016/0063016 A1* | 3/2016 | Eggleston | G06F 16/951 707/706 |
| 2016/0092915 A1* | 3/2016 | Lee | G06Q 30/0241 705/14.45 |

FOREIGN PATENT DOCUMENTS

| | | |
|---|---|---|
| CN | 102023998 A | 4/2011 |
| CN | 103885959 A | 6/2014 |

OTHER PUBLICATIONS

"First Office Action and Search Report Issued in Chinese Patent Application No. 201580015033.6", dated Dec. 27, 2018, 17 Pages.
"Second Office Action Issued in Chinese Patent Application No. 201580015033.6", dated Jul. 19, 2019, 14 Pages.

* cited by examiner

400

US 10,579,630 B2

CONTENT CREATION FROM EXTRACTED CONTENT

CROSS-REFERENCE TO RELATED APPLICATION

This application is a U.S. National Stage Application of PCT/CN2015/070657, filed Jan. 14, 2015, which application is hereby incorporated by reference. To the extent appropriate, a claim of priority is made to the above disclosed application.

BACKGROUND

Quality of created content is important for attracting and engaging users. Services provided can assist clientele by creating and managing content on behalf of such clientele. In doing so, service providers strive to create high-quality content for diverse placement and further desire effective and scalable solutions for management of created content. It is with respect to this general technical environment that the present application is directed.

SUMMARY

Examples of the present disclosure describe content creation of at least one abstract from extracted content. Input information is received that comprises a link to a landing page and keyword information. The landing page is evaluated and content including at least one of image data and text data is extracted from the landing page. Properties of the content extracted are analyzed. The content extracted is ranked based on the analyzed properties and application of at least two ranking algorithms. A first ranking algorithm applied ranks the content based on relevance to the landing page and a second ranking algorithm applied ranks the content extracted based on relevance to the keyword information. The ranked content is filtered to remove content or portions of content that are determined to be unappealing based on applying filtering rules to the ranked content. At least one abstract is created from the filtered and ranked content. Other examples are also described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Non-limiting examples describes automatic content creation for diverse placement through leveraging of machine learning technologies and contextual understanding of content. In some cases, clients (e.g., advertisers, corporations, companies, small or medium size businesses) provide metadata for content creation or modification. In other cases, service providers automatically annotate content for content creation or modification on behalf of clients. The present disclosure describes examples where highly relevant content is automatically extracted from a client's website. The extracted content is analyzed for context, ranked and filtered to create content for placement on behalf of a client. In some examples, the created content is added and maintained in a store for create content. Placement of the created content may also be managed including updating of the placement of the created content.

In many cases, extraction of content for content creation is not done automatically. Basic programming language analysis is performed on code such as (HTML code) to identify content rather than analyzing relevance of the actual content. Examples of the present disclosure enable automatic extraction of highly relevant content from at least one landing page of a client website. A landing page is a section of a website accessed by clicking a hyperlink (e.g., uniform resource identifier (URI) or uniform resource locator (URL)) on another web page. The present disclosure leverages machine learning intelligence to identify representative content such as images/videos, text, rich caption and other crucial meta-data from a landing page of a website. Machine learning intelligence (e.g., machine learning algorithms) is combined with contextual analysis to enable automatic detection of a main block of a landing page, automatic extraction of relevant content from the main block, and efficient creation of high-quality content for placement.

A number of technical advantages are achieved based on the present disclosure including but not limited to: increased processing capabilities, increased efficiency and accuracy in content identification, extraction and creation processing, improved quality in extraction and identification of content that is highly relevant to generation of relevant content abstracts, improved interaction for management and placement of created content, and improved interaction with users who are presented with the created content.

Figure 1:
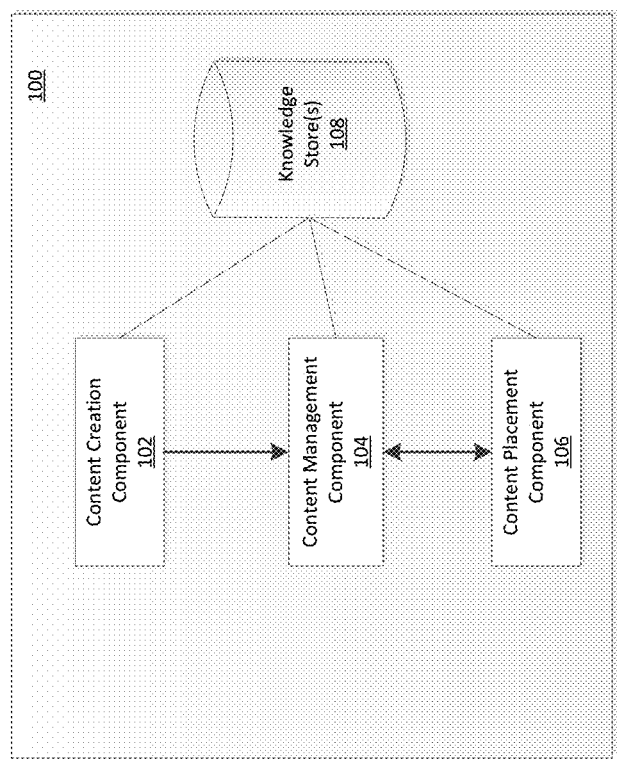
FIG. 1 illustrates an overview of example systems for content creation and management of created content.

FIG. 1 illustrates an overview of example system 100 for content creation and management of created content. The exemplary system 100 presented is a combination of interdependent components that interact to form an integrated whole for processing and management of content. Components of the systems may be hardware components or software implemented on hardware components of the systems. In examples, exemplary system 100 may include any of hardware components (operating system (OS)), software components (e.g., applications, application programming interfaces, virtual machines) running on hardware components, runtime libraries. In one example, system 100 provides an environment for software components to run, obey constraints set for operating, and makes use of resources or facilities of system 100, where components of system 100 may be software (e.g., application, program, module, etc.) running on one or more processing devices. For instance, a content creation application or service may be run on a processing device such as a computer, server, mobile phone, tablet, gaming console, electronic devices, etc., where components of the system may be executed on the processing device. In other examples, components of example systems may be spread across multiple devices. For instance, input may be entered on a client device (e.g., mobile phone) and information may be processed or accessed from other devices in a network such as a server device and/or data store. System 100 also includes components such as data storages/memory/stores, for example a knowledge store 108 shown in FIG. 1 and described below. Each component may comprise one or more system components. Please refer to FIGS. 5-7 for additional examples of hardware that may be included as part of the exemplary systems.

As one example, the system 100 includes components such as a content creation component 102, a content management component 104, a content placement component 104 and a knowledge store 108, each having one or more additional components. The scale of system 100 may vary and include more or less components than those described in FIG. 1. Interfacing between components of system 100 can occur through a network connecting components of a system and/or resources external to system 100. In one example, components of system 100 exist locally on a device such as a mobile device or a server device. In at least one other example, components of the system 100 may be connected through a distributed environment such as a cloud computing environment.

The exemplary system 100 comprises a content creation component 102 that is used to receive input for content creation and create content for placement. The content creation component 102 receives and manages input for content creation. Input may be received from a client such as a business/advertiser that desires to have content, such as advertisements, created for placement. Input can be received in any form, such as a request form, e-mail, telephonic contact, electronic meeting, among other examples. Information that is included in a received input includes but is not limited to: hyperlinks (e.g., URL of a landing page, target URL, a visual URL) keywords for content creation (e.g., keywords for advertisement), a title, abstract/description, information on placement, types of content for creation, and identification of information to be excluded from created content, among other examples. The content creation component 102 may also include a user interface (UI) that enables interaction between a client and a service provider. For example, content creation requests are able to be generated and sent to clients and input information is able to be received for content creation processing.

The content creation component 102 uses the received input to evaluate a landing page or target URL identified in a received input. As an example, an index of a landing page may be evaluated based on the URL of the landing page provided in the received input. The content creation component 102 is configured to identify a URL of a landing page from a received input and automatically evaluate the web page using machine learning algorithms. Machine learning algorithms applied collect, parse, and stores data to facilitate fast and accurate information retrieval. As an example, a machine learning algorithm is employed that may crawl a web page or index of a web page, identify content for extraction, and extract content. In evaluating the landing page, the content creation component 102 may employ a plurality of machine learning algorithms for content extraction. In some examples, extraction of content is signal-based.

In one example, the content creation component 102 creates one or more abstracts from extracted content. An abstract is a transformation of extracted content that is aligned, modified or re-arranged in a new way. In examples, a created abstract is a combination of more than one type of extracted content (e.g., image or video data and text data). That is, an abstract comprises portions or snippets of data from a full landing page that are transformed to be tailored for a specific/targeted purpose (e.g., advertisement generated based on specific input information).

Search engine indexing techniques may identify a type of content to be extracted and perform extraction based on the type of content. Examples of content extracted include but are not limited to: image data, text data, metadata, video data, and audio data, among other examples. During evaluation, the content creation component 102 evaluates data of the landing page and extracts a main block of the landing page. A main block is a dominant portion of the landing page that is a point of emphasis for the landing page and can include one or more types of content (e.g., image and text data). In at least one example, the content creation component 102 further extracts content from the extracted main block. In an example where the main block is text data, the content creation component 102 is able to extract additional information such as sentences or words from a main block of text.

For the extracted content, the content creation component 102 evaluates the properties of the extracted content. Among other things, the properties of the extracted content may be analyzed to determine relevancy of the extracted content including: 1) how relevant the extracted content is to the web page/landing page (e.g., dominance on the landing page), and 2) how relevant the extracted content is to information of the received input information (such as the keyword information provided). For example, when the extracted content is image data, the content creation component 102 analyzes properties of an image that can be identified and analyzed from the image. In that example, natural properties of the image data are identified analyzed such as: whether the image is in portrait or landscape mode, whether the image is in color or black and white, size of the image, the resolution of the image, and identification of people and/or things in the image, among other examples. As another example, the content creation component 102 evaluates properties of text data when the extracted content is identified as text data. In that example, information such as letters, words, number, symbols, sentences, etc., may be extracted from one or more blocks of text and analyzed. The content creation component 102 also uses machine learning algorithms in analyzing properties of the extracted content including evaluating syntax or grammar (e.g., spelling or grammar errors) of text data as well as realigning/correcting the text data to fix identified issues.

The content creation component 102 applies ranking algorithms to the extracted content to better identify content for use in creating abstracts from the extracted content. Content extracted based on the analyzed properties of the content and application of at least two ranking algorithms (e.g., machine learning algorithms). The content creation component 102 may use multiple machine learning algorithms to rank or score content data. A first ranking algorithm applied ranks the content extracted based on relevance to the landing page by analyzing specific properties of the extracted content. As an example, the first ranking algorithm ranks the dominance of an image on the landing page. In doing so, the content creation component 102 assesses the analyzed properties of the image (e.g., size, position, resolutions, persons/objects) and determines a probability as to how dominant the image is to the landing page. A second ranking algorithm applied ranks the content extracted based on relevance to information of the received input information. For example, each piece of image data extracted may be ranked based on a probability of how likely they are to relate to the keyword information included in the received input information. In doing so, the content creation component 102 applies one or more machine learning algorithms that assess the analyzed properties of the image. For example, if a keyword is "snowboard" for a received input requesting creation of an advertisement for a snowboard repair shop, images that include a picture of a snowboard or a person snowboarding would be ranked higher than facial images of the staff of the snowboard shop that do not include a snowboard.

Ranking of the extracted content may be in any way that comprises evaluation using the first ranking algorithm and the second ranking algorithm described above. As an example, ranking may be determined based on statistical modeling (e.g., discriminative/conditional modeling or generative modeling). In one example, individual scores may be calculated for each piece of content in association with a particular ranking algorithm applied. In another example, ranking generates an aggregate score from application of the at least two ranking algorithms described. In yet another example, individual scores are calculated for content based on application of the first ranking algorithm and then re-ranked based on application of at least the second ranking algorithm.

The ranked content is then filtered by the content creation component 102 to remove content or portions of content that may be deemed unappealing to a user. As an example, the content creation component 102 uses at least one machine learning algorithm to apply a filter based on formulated or predetermined rules that are used to identify content or portions of content that may be unappealing to a user. Rule sets for filtering may be formed for different types of content being evaluated (e.g., image data or text data). Rule sets may also differ depending on placement of a created abstract or the type of abstract being created. For example, rule sets evaluating content are different for an abstract created for placement in a newspaper (e.g., newspaper advertisement) as compared with rule sets used for creation of an abstract that is to be used on a search engine page (e.g., advertisement shown on a search engine page or shown when a search result is returned). The present disclosure intelligently applies rules sets based on a type of abstract to be created. Rule sets may be formed and applied using the machine learning algorithms. Rule sets are also adaptive based on learning of the machine learning algorithms where rule sets may perpetually change.

As an example, if the content being evaluated in the filtering is image data, a rule may be set that might removes images that have text included in the image as that might be visually unappealing to a user. In another example, a rule may be set that determines it is okay to have text in an image if the text is a certain type of text (e.g., name or phone number). Other examples of rule sets include but are not limited to: quality requirements, compliance rules for content creation established by clients and/or service providers, rules for relevance to the landing page (e.g., dominance on the landing page), rules for relevance to input information (e.g., keyword information), and rules related to relevance of user response data (e.g., data collected based on user evaluations such as click through rate (CTR) data), among other examples.

The content creation component 102 updates the ranking content based on the filtering processing. For instance, content is removed that is determined to be unappealing based on application of the filtering rules. In some examples, portions of extracted content are removed (e.g., text from an image) and the unremoved portions may be kept for ranking based on the filtering rules. The content that remains is ranked based on the applied filtering rules. The content ranking is updated (e.g., content re-ranked) based on application of the filtering rules. In one example, re-ranking occurs based on the application of filtering rules related to at least one of: 1) relevance to the landing page, 2) relevance to keywords included in the input information and 3) relevance to user response data.

The content creation component 102 uses the filtered and ranked content to automatically create one or more abstracts. As identified above, an abstract is a transformation of extracted content that is aligned, modified or re-arranged in a new way. For example, ranked and filtered content that is extracted from a landing page may be transformed into a different arrangement than is presented on a client landing page. Extracted content may also be modified or changed to improve the quality of a generated abstract. Furthermore, new content may be added to content or portions of content extracted from a landing page that is processed by system 100. Machine learning algorithms are applied to intelligently generate content abstracts and improve quality of the new content generated. In at least one example, dynamic programming is used to evaluate content and automatically create one or more abstracts.

In examples, a created abstract is a combination of more than one type of extracted content (e.g., image or video data and text data). An example of an abstract is an advertisement or annotation advertisement generated by a service provider on behalf of a client. In one example, creation of an abstract transfers content from one form (e.g., text data on a landing page) into another form (e.g., rich content that combines multiple types of content). The arrangement of data may be based on criteria specified by an advertiser (e.g., in the received input information) in combination with the intelligence applied by the system 100. As an example, an abstract created may be a rich content abstract or advertisement. In examples, rich content abstracts (e.g., advertisements) involve some kind of user interaction in association with the created content. Examples of data included in a rich content abstract include but are not limited to: a title, abstract, image, video, text, audio, site links, call/contact addresses, etc.). Rich content abstracts offer additional ways to involve a user with a displayed content as compared with traditional advertising content. Rich content abstracts can expand, float, peel down, etc. The content creation component 102 applies machine learning algorithms to automatically take the extracted, ranked and filtered content and generate abstracts (including transforming the extracted content to apply to the different portions of a rich content abstract (e.g., title, body, image, click-through link, etc.)).

In one example, the content creation component 102 creates a plurality of abstracts for a received input. Different abstracts may be created in accordance with different user demographics. For instance, one abstract may be created for an Italian restaurant that is targeted at a younger demographic (e.g., ages 15-25). In that example, when creating an abstract for the Italian restaurant using an image of Italian food, the content creation component 102 evaluates the ranked and filtered content and determines that an image of a pizza is to be used because it is more appealing to younger adults than an image of a pasta dish. Continuing that example, another abstract may be created for an older demographic (e.g., ages 45-60) where an image of a pasta dish is used instead of an image of pizza because it is determined that the image of the pasta dish is more appealing to users in the age range of forty-five to sixty. Machine learning algorithms are used to evaluate filtered and ranked content for creation of the abstracts to improve the quality and efficiency in content creation by enabling automatic creation of abstracts from the content extracted from a client landing page.

In another example, abstraction creation is associated with a type of abstract to be created as identified in the received input. For instance, a received input may specify that an abstract is to be created for a newspaper or alternatively a movie preview. The content creation component 102 intelligently creates an abstract based on application of machine learning algorithms to tailor the content of the created abstract for the type of abstract identified in the received input. For instance, an abstract comprising text data that has shorter sentences is better suited for an abstract associated with a movie preview, whereas an abstract comprising longer sentences may be better suited for an abstract created for placement in a newspaper.

Alternatively, the content creation component 102 may use machine learning algorithms and/or dynamic programming to tailor creation of an abstract based on other factors including but not limited to: information about a client (e.g., type of business, type of users associated with a business type), statistical or empirical data collected (e.g., data collected based on user responses, predictive information), and information associated with alternative representations of content, among other examples. For example, content may be targeted to marketing of a mini-van for a car manufacturer. In that example, the content creation component 102 can intelligently determine that creating content using words like hatch-back or cross-over vehicle may be more appealing to users than using the word mini-van in the created content. Thus, information associated with alternative representations of content (such as mini-van) can be used to intelligently create or adapt content. In examples, the machine learning algorithms used for content creation are enhanced by metric data. Metric data is any statistical or contextual analysis data that can be usable to improve content creation and placement of created abstracts. Metric data obtained may be used for creation of abstracts as well as placement of abstracts. Abstracts may be created based on analysis of previously collected metric data and/or future prediction of trends related to statistical or contextual analysis of current data (e.g., data related to user demographics). In some examples, metric data is used to track user interaction with a created abstract. Using an example of a rich content abstract, tracked metric data may include information on the number of expansions, multiple exits, video completions and a CTR rate, among other examples. Metric data and machine learning algorithms used by the system 100 may be stored in one or more knowledge stores such as knowledge store 108 described below.

The content creation component 102 interfaces with a content management component 104. The content management component 104 manages created content (e.g., abstracts). As an example, the content management component 104 stores created content in a creative store or one or more storages used for storing all types of created content. Once system 100 creates content using the content creation component 102, the created content is passed for storage to the content management component 104. In at least one example, content is automatically added to a content creative store (e.g., knowledge store 108). One skilled in the art will recognize that in alternative examples, created content may be stored in an additional storage (not shown) separate from the knowledge store 108. Created content for all clients may be managed by the content management component 104. Newly created content is added to the creative store that stores previously created content. In one example, the content management component 104 further organizes stored content. For instance, content may be organized by client, type of abstract, content in a created abstract, placement, subscription (e.g., created content that has been paid for versus created content generated for testing purposes), date and time, and metadata, among other examples. The content management component 104 may also include a user interface (UI) that enables manage the created content. For example, creative stores of the content management component 104 are searchable.

The content management component 104 also interfaces with a content placement component 106. The content placement component 106 manages placement or updating of placement of created content such as abstracts. Created content is selectable from a creative store of the content management component 104 to be placed. As examples, placement of content is based on received input information from a client or on a testing basis for evaluation of created content. In one example, created abstracts may be placed for flighting purposes. Flighting relates to placement of created content for evaluation purposes. For instance, a plurality of abstracts can be uniquely created based on extracted content. In some cases, a client and/or service provider may wish to issue a test run before placing an abstract full-time. A service provider may flight one or more abstracts to accumulate test data that supports placement of a created abstract. Placement of abstracts can be updated based on a response to the flighting of the created abstracts. In some cases, the abstract is modified or updated based on flighting responses. The content placement component 106 may also include a user interface (UI) that enables management of placement for the created content.

Additionally, the content creation component 102, the content management component 104 and the content placement component 106 interface with one or more knowledge components such as knowledge store 108. Knowledge store 108 is a resource that increases an amount of information that an exemplary system possesses, such as system 100, so that system 100 (or components of system 100) can make more informed decisions at a given point in time. Knowledge store 108 may comprise one or more storages or system memories for storing information (e.g., data, applications, operations, programs, etc.). Knowledge store 108 stores any structured and unstructured information that is usable by components of system 100 such as the content creation component 102, the content management component 104 and the content placement component 106 to enhance execution of processing as well as created content. An example of information stored by the knowledge store 108 is knowledge data being any data that enhances robustness of an exemplary system or is able to be applied to improve processing by a component of an exemplary system. For example, the knowledge store 108 may store applicable machine learning algorithms for processing by any of the components of system 100. In another example, the knowledge store 108 stores rule sets for content filtering performed by the content creation component 102. Other Examples of knowledge data stored by knowledge store 108 include but are not limited to: definitions, rules, name data, historical data, interrelationships between components of systems, restrictions (e.g. formal stated descriptions of truth for evaluating data), classes (e.g., collections, concepts, programming types), attribute data (e.g., properties, features, characteristics, parameters), axioms, modeling data including language models, adapted language models, normalization models, statistical data, event and functional term information, usage patterns, word associations, and contextual information, among other examples. The knowledge store 108 may also communicate with components or resources outside of exemplary systems in order to gather or collect information relevant to performing processing and making a best possible decision as to how systems such as system 100 create, manage and place content. As examples, the knowledge store 108 may be linked to network resources over the Internet, for example search engines (e.g., Bing, Google Search, Yahoo Search, Ask, WebCrawler, Dogpile, etc.).

Figure 2:
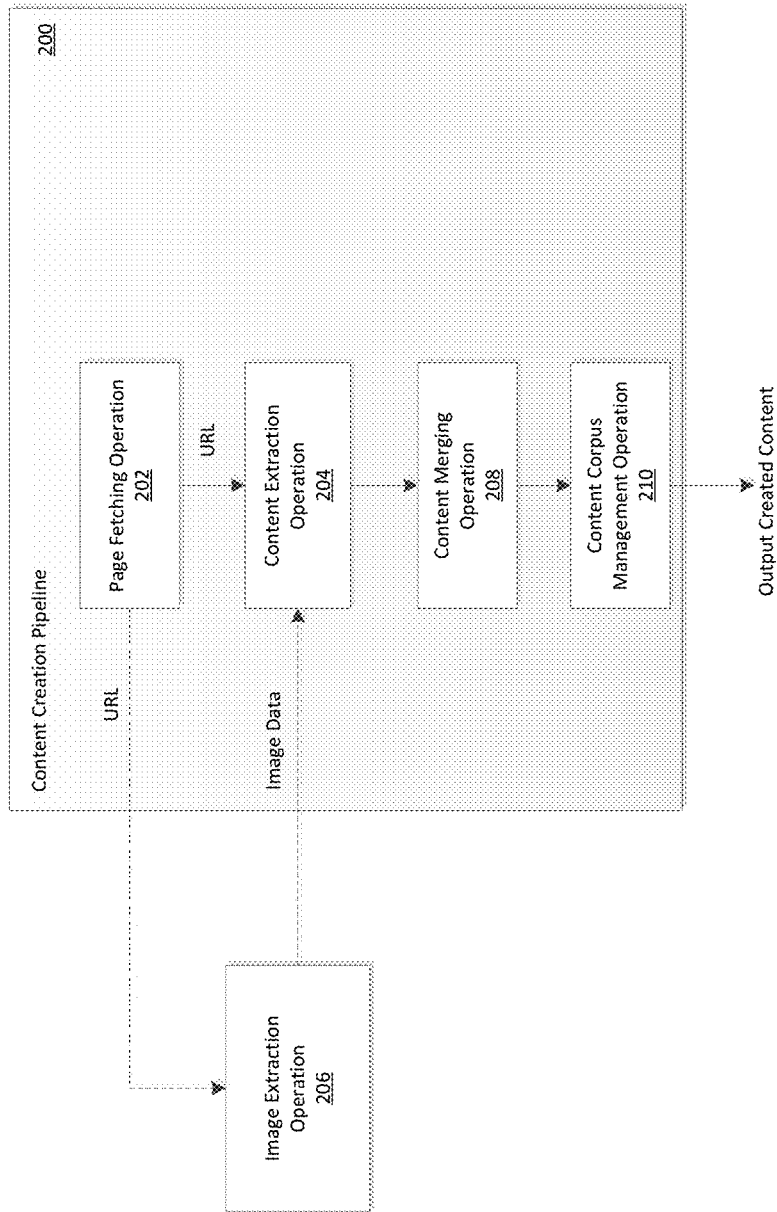
FIG. 2 illustrates an overview of exemplary content creation pipeline.

FIG. 2 illustrates an overview of exemplary content creation pipeline 200. The content creation pipeline 200 is an automated process that can be performed by an application, service or device, for the creation and management of created content. In another example, operations of the content creation pipeline 200 can be executed on one or more components of system 100 as described with respect to FIG. 1.

The content creation pipeline 200 begins with a page fetching operation 202. As an example, one or more web pages or landing pages for created content may be provided by a client seeking creation of created content (such as an abstract described in FIG. 1). In another example, a service provider determines/identifies a URL for a landing page under its own initiative. The page fetching operation 202 passes URLs for landing pages to a content extraction operation 204 and an image extraction operation 206. Ultimately, image data (e.g., images and video data) extracted by the image extraction operation 206 is passed to the content extraction operation 204. However, machine learning algorithms used for image extraction are different from other content extracted (e.g., text data, audio data and metadata) and thus are separately extracted. The content extraction operation 204 extracts content other than image data such as text data, audio data, metadata, etc., using machine learning algorithms. The image extraction operation 206 extracts image content from the one or more URLs provided in the page fetching operation 202 using machine learning algorithms. As an example, extraction of either image content or other content is based on machine learning algorithms that crawl data associated with a landing page (e.g., index data).

Once the image extraction operation 206 has extracted image data from a landing page, the image data is transmitted to a component or operation associated with performance of the content extraction operation 204. The content extraction operation 204 identifies the different types of content extracted from the landing pages, for example, content that is in a title of a landing page, content that is in a body, content that is in headings, etc. In one example, the content extraction operation 204 is able to identify content that is already created for a similar purpose (e.g., an advertisement in a similar ad space) and that is able to modified or transformed by the content creation pipeline 200. In another example the content extraction operation 204 identifies specific types of content for specific purposes such as content that is suitable for a title of a created abstract, or content that is suitable for a body of a created abstract, among other examples.

Following operation of content extraction, the extracted content is merged using a content merging operation 208. The content merging operation 208 comprises creating one or more abstracts from the extracted content. Creation of an abstract may comprises one or more operations performed by a content creation component such as the content creations component 102 described in FIG. 1. As an example, the content merging operation provides an aggregate view of how content can be arranged to create an abstract. The content merging operation 208 comprises creating one or more abstracts from aggregation of the extracted content (e.g., combining more than one type of extracted content).

Abstracts that are created in the content merging operation 208 are passed to a content corpus management operation 210. The content corpus management operation 210 manages storage of created abstracts and placement/updating of the created abstracts. As an example, operations performed in the content corpus management operation 210 may comprise any operations performed by the content management component 104 and the content placement component 106 described in the description of FIG. 1. The content corpus management operation 210 controls output of created content from the content creation pipeline 200.

Figure 3:
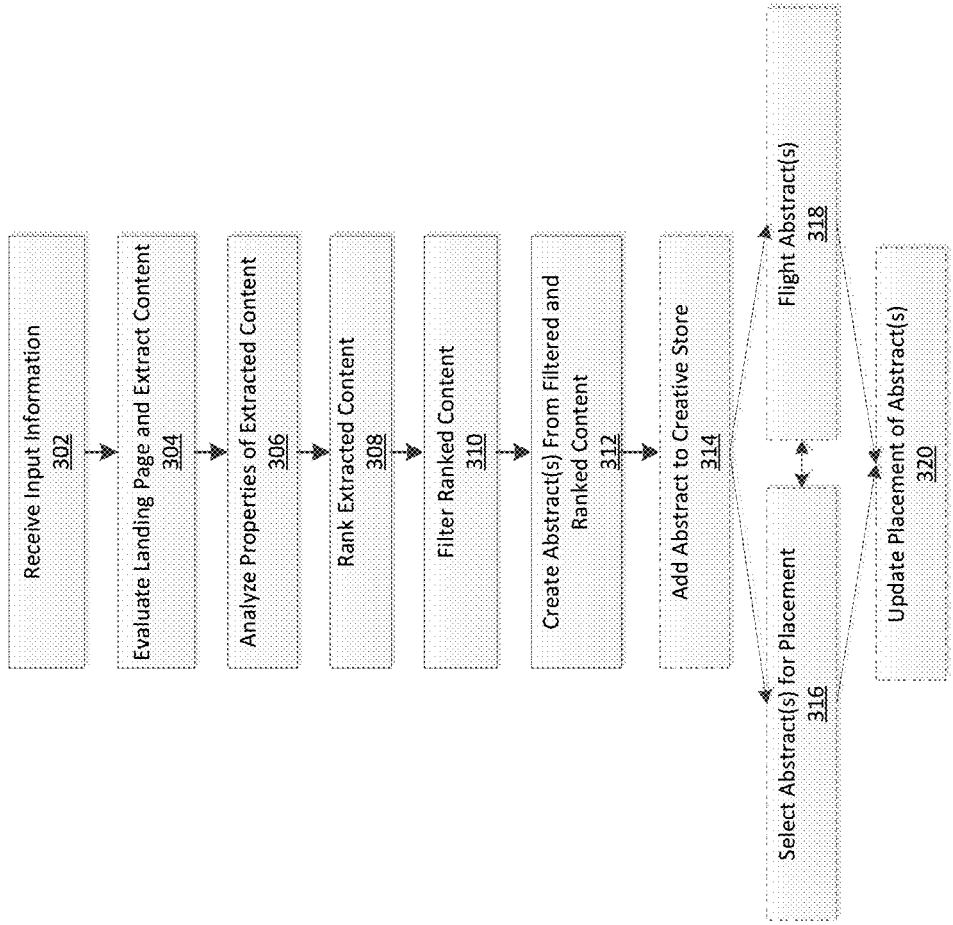
FIG. 3 illustrates an example methods of content creation and management of created content.

FIG. 3 illustrates an example method 300 of content creation and management of created content. As an example, method 300 may be executed by an exemplary system such as system 100 of FIG. 1 or the content creation pipeline 200 of FIG. 2. In one example, method 300 may be executed on a device comprising at least one processor configured to store and execute operations, programs or instructions. However, method 300 is not limited to such examples. In other examples, method 300 may be performed by a content creation application or service. Method 300 may also be implemented on a computing device such as a device having at least one processor and a memory or as a process executed on computer-readable storage device.

Flow begins at operation 302, where input information for content creation is received. Examples of input information are described in the description of FIG. 1. In one example, the input information received in operation 302 comprises a link to a landing page and keyword information. Keyword information is one or more words or phrases that provides context for creation of abstract (e.g., annotation advertisement). Keyword information may be used to determine relevance for extraction, ranking, filtering and creation of content as described in method 300.

Flow proceeds to operation 304 where the landing page is evaluated and content is extracted from evaluation of the landing page. In evaluating the landing page, machine learning algorithms are used to evaluate information associated with the link to the landing page. In examples, operation 304 comprises crawling the landing page and automatically extracting a main block of data from the landing page including at least image data and/or text data. Examples of information identified by machine learning algorithms for crawling of landing pages includes but is not limited to: image data, metadata, text data, logos, and the keyword information provided in the received input. In operation 304, information is automatically extracting from the main block of data of a landing page based on a type of abstract to be created. For example, the received input information may identify a type of abstract to be created. Based on the type of abstract to be created, machine learning algorithms are applied to identify content to be extracted.

Proceeding from operation 304, properties of the content extracted are analyzed (operation 306). As an example, properties of the content extracted (e.g., image data and/or text data) are analyzed to determine relevancy of the extracted content including: 1) how relevant the extracted content is to the web page/landing page (e.g., dominance on the landing page), and 2) how relevant the extracted content is to information of the received input information (such as the keyword information provided). Analysis of properties extracted is described in detail in the description of FIG. 1.

Flow proceeds to operation 308 where content extracted is ranked based on the analyzed properties of the content and application of at least two ranking algorithms. In operation 308, a first ranking algorithm applied ranks the content extracted based on relevance to the landing page and a second ranking algorithm applied ranks the content extracted based on relevance to the keyword information. Further details regarding ranking of extracted content is described in detail in the description of FIG. 1.

The ranked content is filtered (operation 310) to remove content or portions of content that are determined to be unappealing based on applying filtering rules to the ranked content. As an example, the content creation component 102 applies a filter based on formulated or predetermined rules that are used to identify content or portions of content that may be unappealing to a user. Further details regarding filtering of ranked content is described in detail in the description of FIG. 1. In one example, the filtering operation (operation 310) comprises updating ranking of the ranked content based on application of the filtering rules that evaluate at least one of relevance to how dominant content is to the landing page, relevance to the keyword information, and relevance determined from user response data. The updating of the ranking performed in operation 310 may comprises re-ranking the ranked content after content that does not satisfy the filtering rules has either been removed or modified.

Flow proceeds to operation 312 where at least one abstract is created from the filtered and ranked content. In one example, operation 312 creates a plurality of abstracts from the filtered and ranked content. In creating an abstract, operation 312 is configured to be able to modify content from the filtered and ranked content (e.g., extracted content). For example, creation of an abstract may comprises adjusting syntax or grammar, and editing of content (e.g., image or audio data, among other examples. In another example, portions of content extracted are aggregated or concatenated to be transformed into new data. As an example, an abstract created in operation 312 is rich format content (e.g., rich format abstract) created by aggregating and arranging different types of the content extracted including at least two of the image data, the text data and metadata. Rich format content created in operation 312 may also foster interaction with a user through video data, audio data and/or other streaming data (including banners), connection with applets, plugins or other software components or programs, and/or being able to include content that is actionable (e.g., content that is able to be scrolled-over, clicked on, etc.), among other examples. Further details regarding creation of abstracts is described in detail in the description of FIG. 1.

In operation 314, at least one created abstract is added to a store of created abstracts. From the store of created abstracts, at least one abstract is selected (operation 316) for placement based on evaluation of a location of placement for the abstract. Factors that can affect a determination for placement of a created abstract include but are not limited to: requirements specified by clients (e.g., in the received input information), geographic information, demographic information, and content that is included in the created abstract, among other examples. In different examples, a created abstract may be flighted to determine a user response to the abstract. Flighting may occur either before an abstract is selected for placement or after an abstract is selected for placement. For instance, in one example, an operation of flighting (operation 318) may occur before an abstract is selected for placement (operation 316). Flighting (operation 318) comprises collecting and evaluating user response data for the at least one abstract. As an example, flighting (operation 318) is associated with click prediction algorithms (e.g., CTRs). In that example, flighting may occur through a comparison of click-through rate data for each of a plurality of created abstracts. Further details regarding flighting are described in detail in the description of FIG. 1.

In operation 320, placement of one or more of the plurality of abstracts is updated. In one example, operation 320 updated placement of an abstract is based on user response data obtained for one or more of the plurality of abstracts. For instance, user response data is obtainable by flighting (operation 318) one or more abstracts and evaluating results of the flighting. In another example, the updating (operation 320) further comprises modifying content of the abstract based on demographic information. In at least one example, updating of placement of an abstract further comprises comparing results of flighted abstracts and replacing a selected abstract with a different abstract (e.g., an abstract that had better flighting results based on user feedback). Alternatively, updating placement of an abstract comprises modifying content within a placed abstract based on user response data (e.g., flighting results). In another example, placement of a selected abstract can be updated based on factors besides flighting including but not limited to: time/duration, client feedback, automatic update, rotation of abstract content, and service provider discretion, among other examples.

Figure 4:
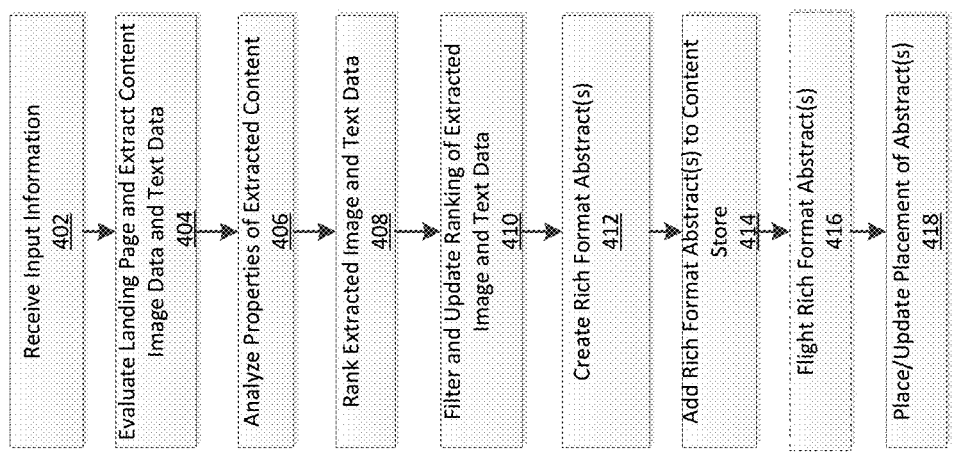
FIG. 4 illustrates an example method of content creation and management of created content.

FIG. 4 illustrates an example method 400 of content creation and management of created content. As an example, method 400 may be executed by an exemplary system such as system 100 of FIG. 1 or the content creation pipeline 200 of FIG. 2. In examples, method 400 may be executed on a device comprising at least one processor configured to store and execute operations, programs or instructions. However, method 400 is not limited to such examples. In other examples, method 400 may be performed by a content creation application or service. Method 400 may also be implemented on a computing device such as a device having at least one processor and a memory or as a process executed on computer-readable storage device.

Flow begins at operation 402, where input information for content creation is received. Examples of input information are described in the description of FIG. 1. In one example, the input information received in operation 402 comprises a link to a landing page and keyword information. Keyword information is one or more words or phrases that provides context for creation of abstract (e.g., annotation advertisement). Keyword information may be used to determine relevance for extraction, ranking, filtering and creation of content as described in method 400.

Flow proceeds to operation 404 where the landing page is evaluated and content is automatically extracted from evaluation of the landing page. In evaluating the landing page, machine learning algorithms are used to evaluate information associated with the link to the landing page. Operation 404 comprises automatically extracting content including at least image data and text data from the landing page using machine learning algorithms. In examples, operation 404 comprises crawling the landing page and automatically extracting a main block of data from the landing page including at least image data and text data. Examples of information identified by machine learning algorithms for crawling of landing pages includes but is not limited to: image data, metadata, text data, logos, and the keyword information provided in the received input. In operation 404, information is automatically extracting from the main block of data of a landing page based on a type of abstract to be created. For example, the received input information may identify a type of abstract to be created. Based on the type of abstract to be created, machine learning algorithms are applied to identify content to be extracted.

Proceeding from operation 404, properties of the content extracted are analyzed (operation 406). As an example, properties of the content extracted (e.g., image data and/or text data) are analyzed to determine relevancy of the extracted content including: 1) how relevant the extracted content is to the web page/landing page (e.g., dominance on the landing page), and 2) how relevant the extracted content is to information of the received input information (such as the keyword information provided). Analysis of properties extracted is described in detail in the description of FIG. 1.

Flow proceeds to operation 408 where content extracted is ranked based on the analyzed properties of the content and application of at least two ranking algorithms. In operation 408, a first ranking algorithm applied ranks the content (including at least image data and text data) extracted based on relevance to the landing page and a second ranking algorithm applied ranks the content extracted (including the image data and the text data) based on relevance to the keyword information. Further details regarding ranking of extracted content is described in detail in the description of FIG. 1.

The ranked content is filtered (operation 410) to remove content or portions of content that are determined to be unappealing based on applying filtering rules to the ranked content. As an example, the content creation component 102 applies a filter based on formulated or predetermined rules that are used to identify content or portions of content that may be unappealing to a user. Further details regarding filtering of ranked content is described in detail in the description of FIG. 1. The filtering operation (operation 410) comprises updating ranking of the ranked content based on application of the filtering rules that evaluate at least one of relevance to how dominant content is to the landing page, relevance to the keyword information, and relevance determined from user response data. The updating of the ranking performed in operation 410 may comprises re-ranking the ranked content after content that does not satisfy the filtering rules has either been removed or modified.

Flow proceeds to operation 412 where at least one rich format abstract is created from the filtered and ranked content. In one example, operation 412 creates a plurality of rich format abstracts from the filtered and ranked content. In creating an abstract, operation 412 is configured to be able to modify content from the filtered and ranked content (e.g., extracted content). For example, creation of an abstract may comprises adjusting syntax or grammar, and editing of content (e.g., image or audio data, among other examples. In another example, portions of content extracted are aggregated or concatenated to be transformed into new data. Operation 412 creates the at least one rich format abstract by arranging and aggregating filtered image data and filtered text data to create the at least one rich format abstract. Rich format content created in operation 412 may also foster interaction with a user through video data, audio data and/or other streaming data (including banners), connection with applets, plugins or other software components or programs, and/or being able to include content that is actionable (e.g., content that is able to be scrolled-over, clicked on, etc.), among other examples. Further details regarding creation of abstracts is described in detail in the description of FIG. 1.

In operation 414, at least one created rich format abstract is added to a store of created abstracts. In examples of method 400, a created abstract may be flighted (operation 416) to determine a user response to the rich format abstract. Flighting (operation 416) comprises collecting and evaluating user response data for the at least one abstract. As an example, flighting (operation 416) is associated with click prediction algorithms (e.g., CTRs). In that example, flighting may occur through a comparison of click-through rate data for each of a plurality of rich format abstracts. Further details regarding flighting are described in detail in the description of FIG. 1.

In operation 418, one or more of a plurality of rich format abstracts is placed or alternatively placement of an abstract is updated. In one example, operation 418 places or updates a rich format abstract based on user response data obtained for one or more of the plurality of abstracts. For instance, user response data is obtainable by flighting (operation 416) one or more abstracts and evaluating results of the flighting. In another example, the placing/updating (operation 418) further comprises modifying content of the abstract based on demographic information. In at least one example, placing/updating of an abstract further comprises comparing results of flighted abstracts and selecting an abstract for placement based on the flighted abstracts. Alternatively, operation 418 comprises modifying content within a placed abstract based on user response data (e.g., flighting results). In another example, placement of a selected abstract can be updated based on factors besides flighting including but not limited to: time/duration, client feedback, automatic update, rotation of abstract content, and service provider discretion, among other examples.

Figure 5:
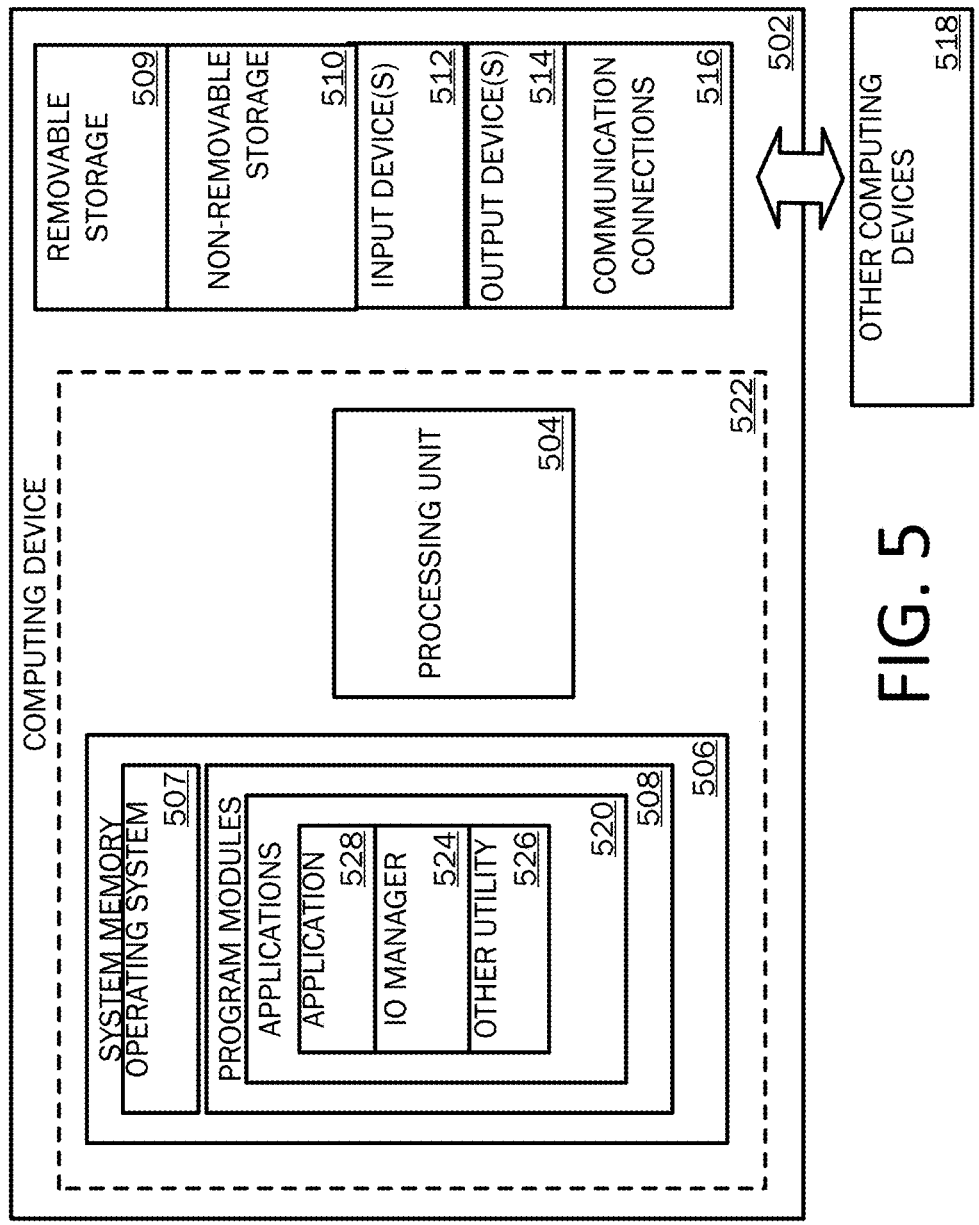
FIG. 5 is a block diagram illustrating an example of a computing device with which aspects of the present disclosure may be practiced.
Figure 6A:
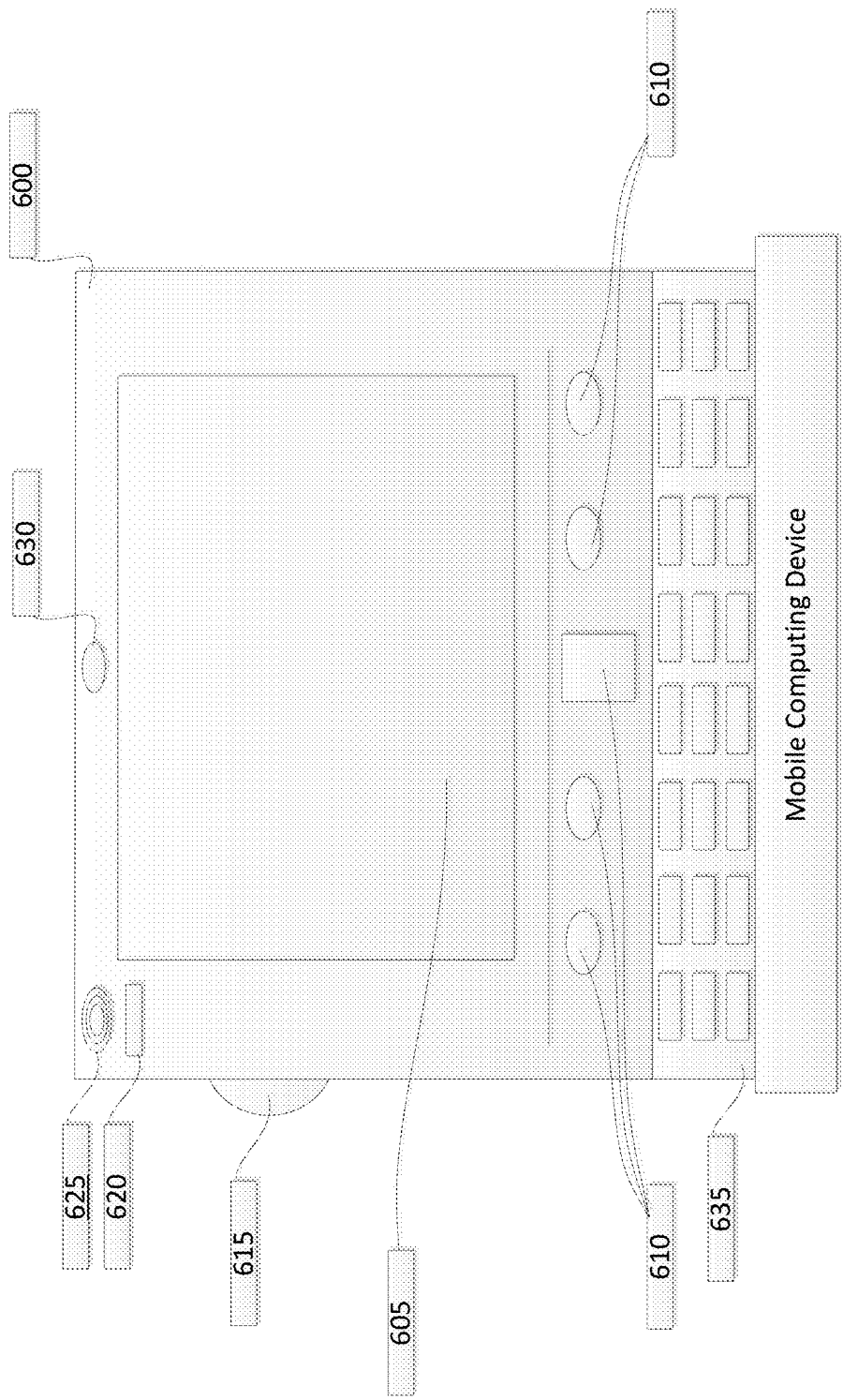
FIGS. 6A and 6B are simplified block diagrams of a mobile computing device with which aspects of the present disclosure may be practiced.
Figure 6B:
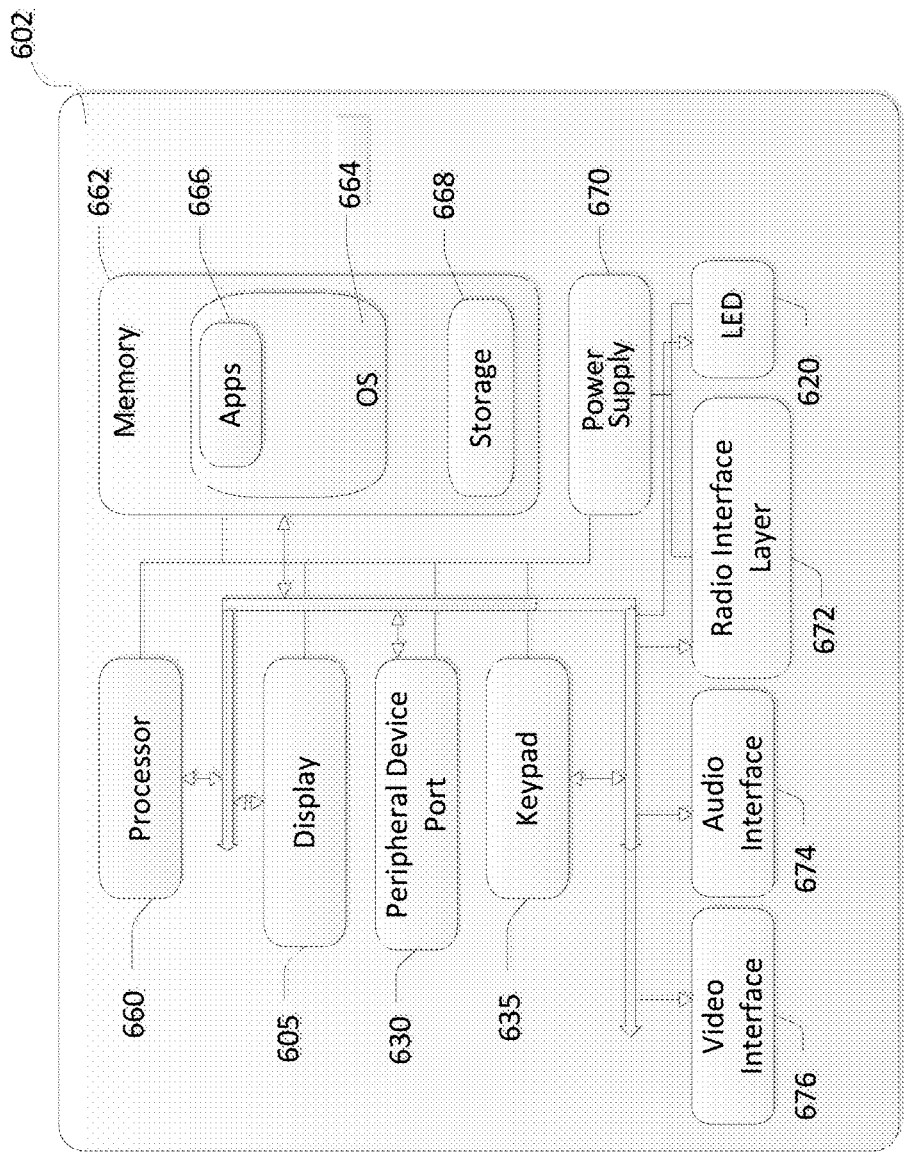
Figure 7:
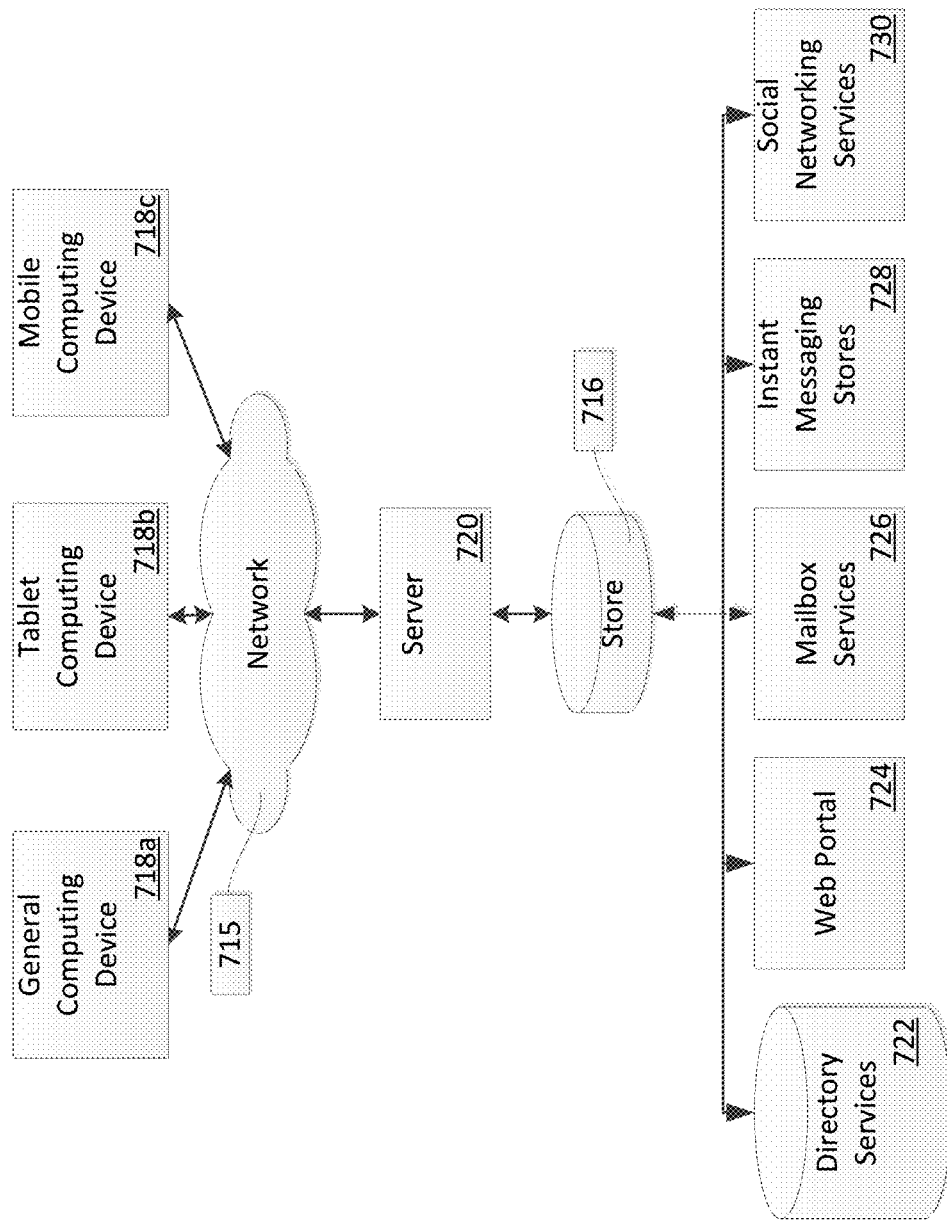
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of a system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, IO manager 524, and other utility 526. As examples, system memory 506 may store instructions for execution. Other examples of system memory 506 may components such as a knowledge resource. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational methods 300-400 illustrated in FIGS. 3 through 4, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as system 100, components of systems and/or services 100 and 200 may be configured to execute processing methods as described in FIGS. 3-4, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, input processing, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, 10 manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
receiving input information for content creation, the input information comprising a link to a landing page and keyword information;
evaluating the landing page and extracting content including at least one of image data or text data from the landing page, the content extracted comprising a main block of the landing page that is a point of emphasis for the landing page;
ranking the content extracted based on an analysis of one or more properties of the content and application of at least two ranking algorithms, wherein a first ranking algorithm applied ranks the content extracted based on relevance to the landing page and a second ranking algorithm applied ranks the content extracted based on relevance to the keyword information;
filtering the ranked content to remove content or portions of content that are determined to be unappealing based on applying filtering rules to the ranked content; and
creating at least one abstract from the filtered and ranked content.

2. The computer-implemented method according to claim 1, further comprising:
adding the at least one created abstract to a store of created abstracts; and
selecting the at least one abstract from the store of created abstracts for placement based on evaluation of a location of placement for the abstract.

3. The computer-implemented method according to claim 1, wherein the extracting of the content comprises crawling the landing page and automatically extracting the main block of data from the landing page including the at least one of the image data or the text data, and automatically extracting information from the main block of data based on a type of abstract to be created.

4. The computer-implemented method according to claim 1, wherein:
creating the at least one abstract comprises creating a plurality of abstracts from the filtered and ranked content, each abstract in the plurality of abstracts aligns, modifies, or re-arranges the extracted content to produce new extracted content;
the computer-implemented method further comprises:
selecting at least one abstract from the plurality of abstracts for placement on the landing page; and
placing the at least one abstract on the landing page based on received flighting responses.

5. The computer-implemented method of claim 4, further comprising updating the placement of the at least one abstract on the landing page based on geographic information.

6. The computer-implemented method according to claim 5, wherein updating the placement of the at least one abstract on the landing page comprises updating the placement of the at least one abstract on the landing page based on demographic information.

7. The computer-implemented method according to claim 1, wherein the at least one abstract created is rich format content created by aggregating and arranging different types of the content extracted including at least two of the image data, the text data or metadata.

8. The computer-implemented method according to claim 1, wherein creating the at least one abstract further comprises modifying content from the filtered and ranked content to create the at least one abstract.

9. The computer-implemented method according to claim 1, further comprising fighting the at least one abstract to determine a user response to the at least one abstract, wherein the flighting comprises collecting and evaluating user response data for the at least one abstract.

10. The computer-implemented method according to claim 1, wherein filtering the ranked content further comprises updating ranking of the ranked content based on application of the filtering rules that evaluate at least one of relevance to how dominant content is to the landing page, relevance to the keyword information, or relevance determined from user response data.

11. A system comprising:
a memory; and
at least one processor, connected with the memory, executing a process comprising:
receiving input information for content creation, the input information comprising a link to a landing page and keyword information,
evaluating the landing page and extracting content including at least one of image data and text data from the landing page, the content extracted comprising a main block of the landing page that is a point of emphasis for the landing page;
ranking the content extracted based on an analysis of one or more properties of the content and application of at least two ranking algorithms, wherein a first ranking algorithm applied ranks the content extracted based on relevance to the landing page and a second ranking algorithm applied ranks the content extracted based on relevance to the keyword information,
filtering the ranked content to remove content or portions of content that are determined to be unappealing based on applying filtering rules to the ranked content; and
creating at least one abstract from the filtered and ranked content.

12. The system according to claim 11, where the process executed further comprises:
adding the at least one created abstract to a store of created abstracts, and
selecting the at least one abstract from the store of created abstracts for placement based on evaluation of a location of placement for the at least one abstract.

13. The system according to claim 11, wherein:
extracting the content comprises crawling the landing page and automatically extracting the main block of data from the landing page including the image data and the text data; and
automatically extracting information from the main block of data based on a type of abstract to be created in the creating.

14. The system according to claim 11, wherein:
creating the at least one abstract comprises creating a plurality of abstracts from the filtered and ranked content; and
the process executed further comprises updating placement of one or more abstracts in the plurality of abstracts based on user response data obtained for the one or more abstracts in the plurality of abstracts.

15. The system according to claim 14, wherein updating the placement of the one or more abstracts further comprises modifying content of the one or more abstracts based on demographic information.

16. The system according to claim 11, wherein creating the at least one abstract further comprises modifying content from the filtered and ranked content to create the at least one abstract.

17. The system according to claim 11, further comprising fighting the at least one abstract to determine a user response to the at least one abstract, wherein the fighting comprises collecting and evaluating user response data for the at least one abstract.

18. The system according to claim 11, wherein filtering the ranked content further comprises updating ranking of the ranked content based on application of rules sets evaluating at least one of relevance to a dominance on the landing page, relevance to the keyword information, or relevance determined of user response data.

19. A computer-readable storage device containing instructions, that when executed on at least one processor, causing the processor to execute a process comprising:
receiving input information for content creation, the input information comprising a link to a landing page and keyword information;
evaluating the landing page and automatically extracting content including image data and text data from the landing page using machine learning algorithms, the content extracted comprising a main block of the landing page that is a point of emphasis for the landing page;
ranking the image data and the text data extracted based on an analysis of one or more properties of the content and application of at least two ranking algorithms, wherein a first ranking algorithm applied ranks content extracted based on relevance to the landing page and a second ranking algorithm applied ranks the content extracted based on relevance to the keyword information;
filtering the ranked content to remove content or portions of content that are determined to be unappealing based on applying filtering rules to the ranked content, wherein the filtering comprises updating ranking of ranked image data and ranked text data based on application of the filtering rules that evaluate at least one of relevance to how dominant content is to the landing page, relevance to the keyword information, or relevance determined from user response data; and
creating at least one rich format abstract from the filtered and ranked content, wherein the creating arranges and aggregates filtered image data and filtered text data to create the at least one rich format abstract.

20. The computer-readable storage device according to claim 19, wherein the process executed further comprises:
fighting the at least one rich format abstract to determine a user response to the at least one rich format abstract, wherein the flighting comprises collecting and evaluating user response data for the at least one rich format abstract.

* * * * *